(12) United States Patent
Giesel

(10) Patent No.: US 6,982,629 B2
(45) Date of Patent: Jan. 3, 2006

(54) METHOD FOR CHILD SEAT RECOGNITION IN A VEHICLE

(75) Inventor: A. Ruediger Giesel, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 430 days.

(21) Appl. No.: 10/265,841

(22) Filed: Oct. 7, 2002

(65) Prior Publication Data

US 2003/0090379 A1    May 15, 2003

(30) Foreign Application Priority Data

Oct. 5, 2001   (DE) ............................... 101 49 117

(51) Int. Cl.
   *H04Q 5/22*    (2006.01)
   *B60Q 1/00*    (2006.01)
   *B60R 21/32*   (2006.01)
   *G06F 7/00*    (2006.01)
   *A47D 1/10*    (2006.01)

(52) U.S. Cl. ............................... 340/10.42; 340/572.1; 340/425.5

(58) Field of Classification Search ............. 297/256.12–256.16; 340/10.42, 425.5, 572.1; 701/45, 49; 280/735–739; 180/271–273
See application file for complete search history.

(56) References Cited

U.S. PATENT DOCUMENTS

| | | | |
|---|---|---|---|
| 3,754,187 A * | 8/1973 | Deming ................. | 340/825.72 |
| 4,852,934 A * | 8/1989 | Yasuda et al. ................ | 296/64 |
| 5,711,574 A * | 1/1998 | Barnes ................... | 297/216.11 |
| 5,790,031 A * | 8/1998 | Shelton et al. .............. | 280/735 |
| 5,793,291 A * | 8/1998 | Thornton ................. | 340/573.1 |
| 5,828,233 A * | 10/1998 | Nguyen et al. ............... | 326/86 |
| 5,851,026 A * | 12/1998 | Schoos et al. ............. | 280/735 |
| 6,198,998 B1 * | 3/2001 | Farmer et al. ................ | 701/45 |
| 6,356,187 B2 * | 3/2002 | Jinno et al. .................. | 340/438 |
| 6,365,187 B2 * | 4/2002 | Mathiowitz et al. ........ | 424/486 |
| 6,411,202 B1 * | 6/2002 | Gal et al. ................ | 340/425.5 |
| 6,535,137 B1 * | 3/2003 | Ryan .......................... | 340/687 |
| 6,696,948 B2 * | 2/2004 | Thompson et al. ......... | 340/561 |
| 6,764,095 B2 * | 7/2004 | Stephan et al. ............. | 280/735 |

FOREIGN PATENT DOCUMENTS

| | | |
|---|---|---|
| DE | 195 18 410 | 11/1996 |
| DE | 195 19 130 | 12/1996 |
| DE | 198 03 682 | 8/1998 |
| JP | 11 278210 | 10/1999 |

OTHER PUBLICATIONS

Patent Abstracts of Japan vol. 1998, No. 10-085823, Mar. 1998.

* cited by examiner

Primary Examiner—Michael Horabik
Assistant Examiner—Kimberly Jenkins
(74) Attorney, Agent, or Firm—Kenyon & Kenyon

(57) ABSTRACT

A method and device for child seat recognition in a vehicle involving use of radio signals to recognize a child seat. The child seat includes a passive transponder. The radio signal is sent back by the child seat and is then sampled by a device in the vehicle, the computing time between the sampled values is used for the management of other tasks. After the termination of the sampling, the evaluation occurs. This is controlled using interrupts.

7 Claims, 3 Drawing Sheets

METHOD FOR CHILD SEAT RECOGNITION IN A VEHICLE

FIELD OF THE INVENTION

The present invention relates to a method and device for child seat recognition in a vehicle.

BACKGROUND INFORMATION

Patent Abstracts of Japan 10-085823 and Japanese Patent No. 11-278210 discuss a method and device for child seat recognition in which the child seat is recognized using a transponder. Radio signals are thus used for the child seat recognition.

German Published Patent Application No. 195 18 410 discusses a method for child seat recognition in which a radio signal is used for the execution of the child seat recognition. German Published Patent Application No. 198 03 682 discusses using a radio signal for child seat recognition and converting the radio signal by a seat sensor unit in the child seat on the basis of a predetermined format, the radio signal is transmitted back to a control unit. German Published Patent No. 195 19 130 discusses repetition of child seat recognition in predetermined time segments.

SUMMARY OF THE INVENTION

The exemplary method according to the present invention for child seat recognition in a vehicle may provide that the sampling of radio signals sent back from the child seat is executed after the reception thereof. In this manner, it may be provided that, during the reception of the radio signals and the sampling thereof, which is part of the reception, other processes may be executed on the processor on which the sampling of the received radio signal is performed. In this manner, other tasks and software modules, for example relating to occupant classification, to error management, or to diagnosis, may continue to be executed until the radio signal has been completely sampled and the evaluation may occur. Ultimately, this results in a more optimal use of the existing resources. A better exploitation may be achieved here with respect in particular to memory and computing capacity. In particular, conflicts may result if data relating to occupant classification are also still being sampled. Thus, the exemplary method according to the present invention may allow for better partition of these tasks, so that such conflicts are resolved.

The radio signals may have different frequencies and may be used in succession. This may allow for use of the optimal frequency for the child seat recognition. In a second step, only the radio signal having this optimal frequency is then used to perform the actual child seat recognition.

An interrupt controlling may be provided for the exemplary method according to the present invention. The transmission and the reception may be controlled by interrupts. That is, the transmission of the radio signal is triggered by the interrupt, and the radio signals are then received again from the child seat. If no child seat is present, no radio signal may be received, so that as a result a maximum time until the reception of the radio signal is provided, after the expiration of which the method is aborted. The interrupt controlling is a valuable manner of controlling various processes so as to enable resolution of conflicts between competing processes.

The sampling of the received radio signal is performed up to a predetermined value. That is, the number of sampled values regarded as sufficient is predetermined. Using a flag, the processor may then query whether the sampling has terminated, so that the evaluation may then occur after the sampling. That is, during the sampling of the received radio signal the evaluation software is stopped, and is reactivated only when it is actually used. In this manner, the evaluation software may not block resources on the processor.

In addition, a maximum of six different frequencies may be used, this number may be advantageous for discovering the optimal frequency in a frequency range from 123–133 kHz.

The signals, received at different frequencies, are then evaluated in order to discover the frequency at which an optimal reception quality is present.

The radio signal having the optimal frequency is then again used to perform the child seat recognition. This child seat recognition is then performed repeatedly at predetermined time intervals, in order in this manner to determine the situation and change of position of the child seat.

In addition, during a sampling process other tasks may be executed by the processor by an interrupt controlling. That is, between the individual sampled values, computing time is enabled for the management of other tasks.

Finally, a device may be present for the execution of the exemplary method according to the present invention. A control device is connected to a child seat recognition device and is connected with an occupant recognition device, for example a seat mat or a video recognition system.

Exemplary embodiments of the present invention are shown in the drawings, and are explained in the following description.

DETAILED DESCRIPTION

Figure 1:
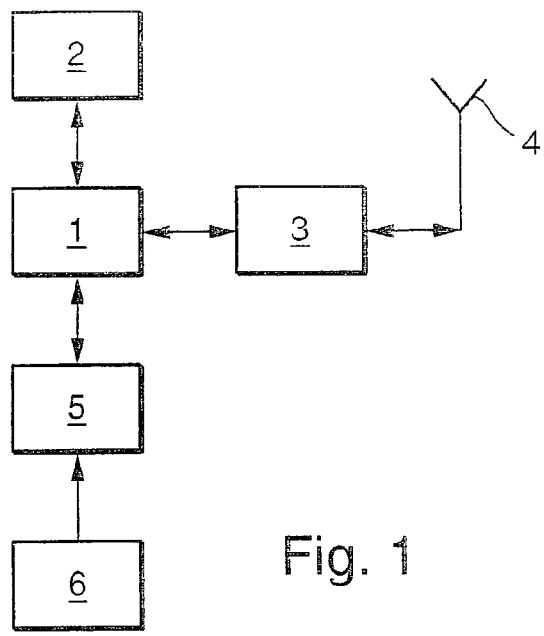
FIG. 1 shows a block diagram of the exemplary device according to the present invention.

Via a transponder system, an automatic child seat recognition system may recognize the positioning of a child seat, so that it may then be communicated to the air bag control device whether a child seat is present or not. In this manner, it may be allowed to avoid dangerous situations that could result from a triggering of the air bag. Here, the child seat recognition is performed in that, from a transmission antenna integrated in the seat mat, a frequency in the range from 123–133 kHz is radiated, and a bit protocol contained in the transmitted radio signal is phase-modulated via two resonators mounted in the child seat. A passive transponder is thus present. For the reception of the phase-modulated signal, two reception antennas are then present in the seat mat that are connected with a demodulator, from which the received signals are then read into a processor and are demodulated using software. Frequently, two channels are available. From the quality of the bit protocols of transponders A and B, as well as the amplitude thereof, a judgment may be made concerning the orientation and correctness of the position of the child seat.

In the automatic child seat recognition system presented here, first an offset measurement is performed on channels A and B for calibration. Here, the offset level is determined while the transmitter is shut off. The transponder voltage is then run up; once the transmitter is switched on, a waiting period ensues until the transponder voltage for operation has built up.

The next step is referred to as the frequency sweep. A maximum of six frequencies are set in succession, and the amplitude of a direct-voltage signal from the demodulator is sampled in order to determine which frequency and phase position yield an optimal degree of efficiency for the sampling. In the protocol of the transponder, at the beginning there are 12 header bits that are output by the demodulator as a direct-voltage signal. These are now sampled using software; this occurs via four analog-digital channels, left and right channel respectively, with in each case zero or thirty degrees demodulator phase position. This occurs for transponders A and B in succession.

The sampling of the identification, i.e., of the child seat recognition, then occurs. After the different frequencies have been used to find the optimal frequency and the demodulator phase position, a transponder protocol is again started, and, using a defined frequency, it is initially checked again for its header, i.e. the frame head, in order to change the phase position again if necessary. The sampling of the actual child seat recognition then occurs, first for transponder A, then for transponder B. The demodulation is first performed in hardware, in a processor or an ASIC. The demodulated signal is stored in a data array. The data contained there is evaluated using a special algorithm, a cross-correlation, in order to obtain the bit sequence of the transponder. According to whether the demodulation has supplied valid values, and dependent on the signal amplitudes, a corresponding position of the child seat is then determined. This result is then filtered, that is, it is verified through repeated occurrences. The type of seat is determined from the data.

Dependent on the transmission frequency that is set, a sampling rate is determined with which the received signal from the child seat is then sampled. The sampling rate may here assume for example 12 different values, and extends from 150 microseconds to 230 microseconds. These times designate the time spacings between the individual sampling times. The duration of such an uninterrupted scan lasts a maximum of 90 milliseconds, so that it is clear that the times between the individual sampled values are to be used for the execution of other tasks. Thus, according to the present invention a timer interrupt is used that is activated by the control program at a given time and is then continually reactivated with a corresponding period. Here the analog-digital conversion, as well as the preparation of the sampling result, occurs in the interrupt program. The continuation of the automatic child seat recognition does not occur until after all necessary sampled values have been provided. This procedure permits the execution of other modules during the sampling.

The main module of the child seat recognition software is here called AK-Scan. In this module, the recording process is controlled, and the determination of the optimal transmission frequency is performed. The identifications are extracted from the obtained data, and the evaluation is provided for the determination of the position of the child seat. The software module AK-Record is used for the sampling of the analog-digital channels; here there are two manners of proceeding. On the one hand, the header, i.e. the frame head, of the received signal is sampled in order to discover ideal settings. Practically, this is a direct-voltage measurement. On the other hand, the actual identification scan occurs, encompassing the sampling of some header bits of a synchronization sequence, as well as of the identification bits. The module AK-Con contains the subfunctions required for the controlling of the transceiver device for the formation of the ASIC protocols, as well as the driver for a serial interface. The module for the protocol updating writes the items of information obtained through the automatic child seat recognition system into the protocol blocks that are to be sent to the air bag control device.

Figure 6:
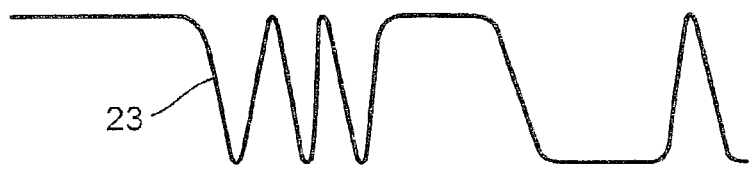
FIG. 6 shows a signal form of the received radio signal.

FIG. 6 shows a typical time curve of the identification channel as read in by the analog-digital channels of the processor. The signal curve is here designated with reference character 23. The disturbances on signal 23 is filtered out.

Figure 5:
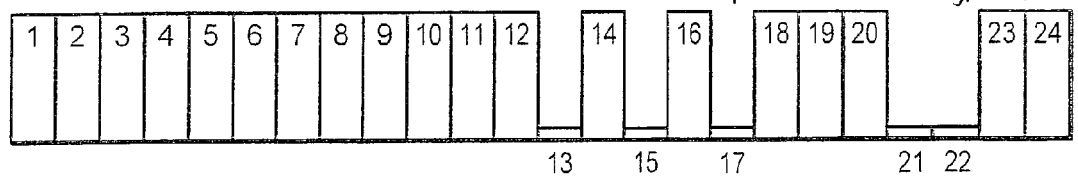
FIG. 5 shows a signal structure of the radio signal.

FIG. 5 shows, as an example, a modulated identification as contained in the radio signal sent back from the child seat. The synchronization sequence is indicated at positions 13 to 17. At position 20, the channel is indicated; positions 21 and 22 are used to determine the seat type.

A part of the automatic child seat recognition is the analysis for the determination of the optimal frequency at which a search is performed, using various frequencies, in order to discover the optimal frequency for the execution. The sampling rate of the processor depends directly on the set transmission frequency and on the relevant resonator, housed in the child seat. The evaluation method provides that each bit to be acquired, whose length depends on the foregoing, is sampled with the sixteen-fold value. This yields a frequency-synchronous sampling of the protocol, i.e., a variable sampling rate.

For this purpose, a real-time operating system is required. This real-time operating system has the following properties: operation of the automatic child seat recognition system via a state machine (or logic circuit); exploitation of the necessary delays, for example after switching on the transmitter, for other tasks of the overall system, for example occupant recognition, and also that other tasks may be executed between the sampled values; and handling of the ASIC commands, which require operations such as switching on the transmitter, setting the frequency, etc.

The exemplary method of the present invention provides for a method that structures the sampling of the identification signal with a variable frequency in such a manner that other tasks may be executed in the time between the sampled values. In addition, here it is to be taken into account that the operating system also has an interrupt structure, which however runs in a chronologically constant fashion.

The method is as follows: given the setting of a particular transmission frequency, the required sampling rate is calculated, and in this manner the interrupt is initialized to this value. Subsequently, this interrupt is enabled, and the acquisition of the data runs in the interrupt routine. Here, after a state has been reached in the control module AK-Scan, the module AkRec is in turn called, as what is referred to as a sublogic circuit, in which the sampling is finally started in the form of an interrupt enabling. Via a flag query, it is determined whether the sampling has been completed, whereupon the interrupt is blocked, and work continues with the next state in AK-Scan. The sampling thus runs autonomously, and does not stop until a sufficient number of measurement values has been acquired. While all other tasks and modules, e.g. the occupant classification, error management, or diagnosis, continue to run, the software of the automatic child seat recognition system is stopped until the interrupt is blocked again. The evaluation of the sampled values occurs directly after this.

Figure 7:
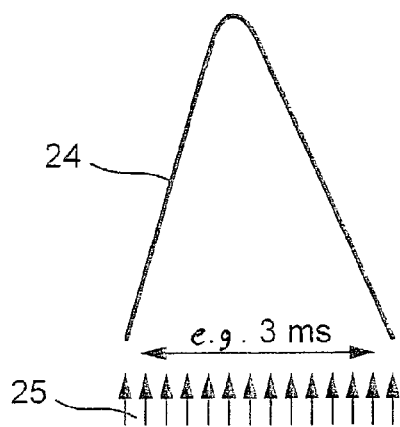
FIG. 7 shows a sampled value.

FIG. 7 shows the fundamental idea of the exemplary method according to the present invention. The curve 24 designates a bit to be sampled, which, as explained above, is to be sampled with the sixteen-fold value. Below this, designated with reference character 25, the individual sampled values are found. Between the sampled values is time that is enabled for the processor for other tasks. This is achieved through an interrupt controlling. That is, the running process, which is in fact entirely inactive, is frozen until the next sampled value, and other tasks may be accomplished. Besides interrupt controlling, other types of controlling may be allowed.

FIG. 1 shows the exemplary device according to the present invention, in which a processor 1 is connected, via a data input/output, with a memory unit 2, and is connected via a second data input/output with a transceiver device 3, and is connected via a third data input/output with a signal processing unit 5. An antenna 4 is connected to one input/output of transceiver device 3. An occupant recognition sensor 6, for example a seat mat that reacts to pressure, is connected to one data input of signal preparation unit 5. Instead of using only one antenna, here a plurality of antennas may be connected.

Antenna 4 is, as represented above, also housed in the seat cushion, and via this antenna of the radio signal is transmitted in order to discover whether a child seat is attached to the vehicle seat. For this purpose, transceiver device 3 produces a radio signal that is sent out via antenna 4. This radio signal is then modified by the child seat, using a phase modulation, and is been sent back, so that this signal may be received by antenna 4. Thus, a passive transponder is present.

Transceiver station 3 filters this signal, amplifies it, converts it to an intermediate frequency, and digitizes it. Processor 1 then obtains this digitized signal and evaluates it. If the modulation corresponds to that expected from a child seat, processor 1 recognizes a child seat. The data required for the comparison are contained in memory 2. The radio signal is sampled for the digitization. During this time, between the individual sampled values, processor 1 may accomplish other tasks, for example the evaluation of sensor values from occupant recognition sensor 6. Other tasks, such as the diagnosis of connected components, and error management, may be accomplished here.

Figure 2:
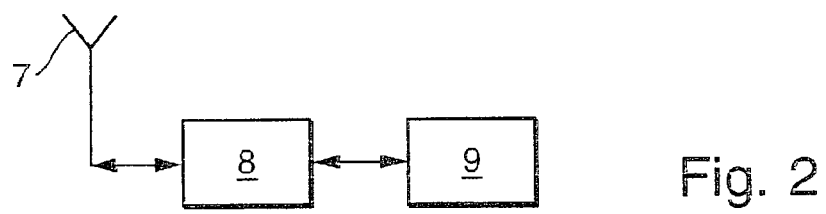
FIG. 2 shows a block diagram of the transponder in the child seat.

FIG. 2 shows a block diagram of the device, which is arranged in the child seat and is formed as a passive transponder. An antenna 7 receives the signal sent out by antenna 4 and transmits it to a resonator 8, which causes a modulation of the received signal. At a reflector 9 the signal is reflected, and is sent back via resonator 8 and antenna 7. A passive transponder as shown here may provide that no energy supply is required in the child seat.

Figure 3:
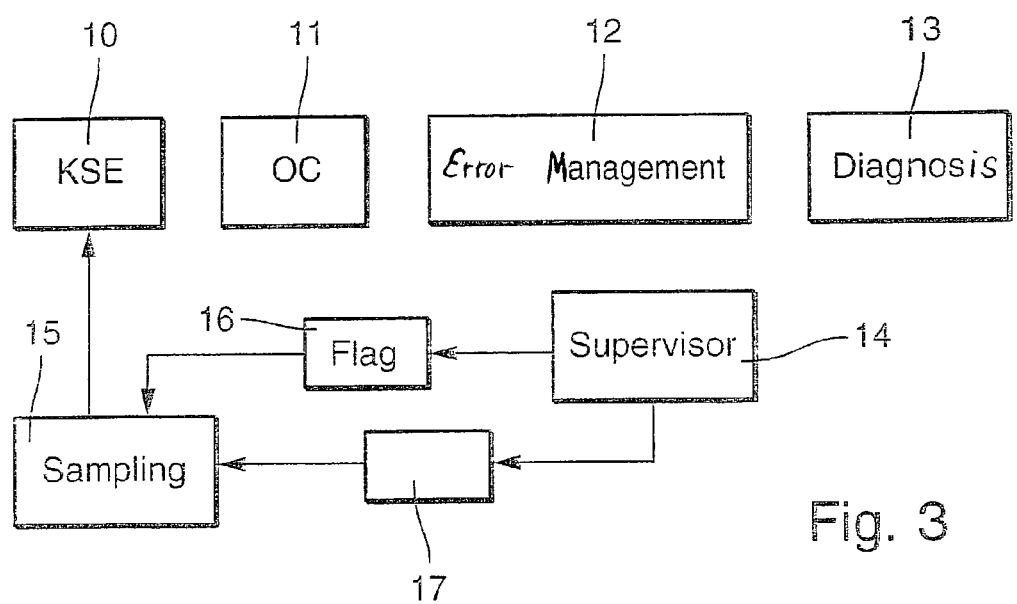
FIG. 3 shows the software hierarchy in the processor.

FIG. 3 shows the software hierarchy used on processor 1. In block 10, the child seat recognition system is represented, which thus evaluates the received signals coming from the child seat. The sampling in block 15 is executed independent of process 10, as soon as it has been started by a higher-order control program 14, here designated Supervisor, via an interrupt 17. Via a flag 16, control program 14 recognizes whether sampling 15 is finished with the current value. If this is the case, then child seat recognition system 10 may perform the evaluation. Between the individual sampled values, control program 14 enables computing power for other processes 11, the occupant classification (here designated OC), the error management (here designated 12), and the diagnosis (here designated 13).

Figure 4:
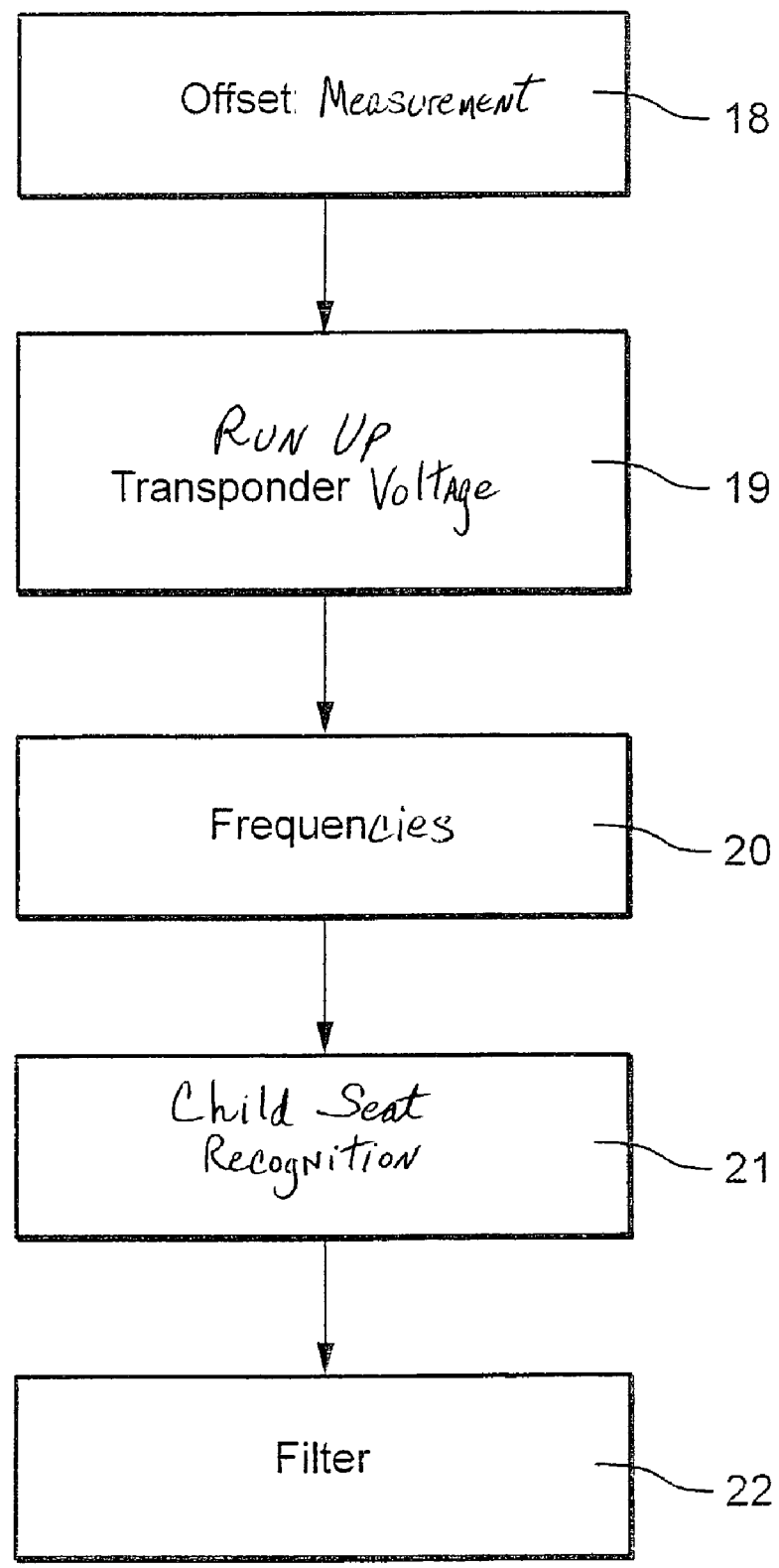
FIG. 4 shows a flow diagram of the exemplary method according to the present invention.

In FIG. 4, a flow diagram of the exemplary method according to the present invention is shown. In method step 18, the offset measurement occurs as represented above. In method step 19, the transponder voltage is then run up. In method step 20, the individual frequencies are run through, that is, radio signals having different frequencies are sent out in succession in order to discover which frequency is the optimal one. The received radio signals are sampled; here, between the sampled values processor 1 is given computing time in order to accomplish other tasks. In method step 21, the actual child seat recognition occurs, after the optimal frequency has been sought out and transmitted. For this purpose, the identification, i.e., the modulation that the child seat has added to the received signal, is evaluated. In method step 22, a filtering of the received signal then occurs.

What is claimed is:

1. A method for recognizing a child seat in a vehicle, the method comprising:
    receiving a radio signal at the child seat, the radio signal being transmitted through a transceiver station in the vehicle;
    modifying the radio signal at the child seat, to provide a modified radio signal;
    transmitting the modified radio signal to the transceiver station;
    sampling the modified radio signal using a processor to provide a sampled radio signal, a time of the processor being made available for other tasks between a plurality of individual times of the sampling; and
    evaluating the sampled radio signal after the sampling is complete;
    wherein radio signals having different frequencies are used in succession, and the transmitting, the receiving, and the sampling of the radio signal are controlled by a respective interrupt.

2. The method of claim 1, wherein the sampling of the radio signal is performed up to a predetermined value, a flag is used to query whether the sampling is terminated, and the evaluating occurs after the sampling.

3. The method of claim 1, wherein the different frequencies is a maximum of six different frequencies.

4. The method of claim 3, wherein, dependent on the evaluating, a frequency is selected with which the radio signal is again transmitted to the child seat, and, when the modified radio signal is transmitted by the child seat, recognition of the child seat is performed based on the modified radio signal.

5. The method of claim 4, wherein recognition of the child seat is repeated at a plurality of predetermined time intervals using the radio signal at the selected frequency.

6. A device for recognizing a child seat in a vehicle, comprising:
    a transceiver station in the vehicle;
    a control arrangement including a processor that is connected to the transceiver station, the processor being configured for interrupt controlling, the control arrangement being operable to recognize the child seat by:
        transmitting a radio signal through the transceiver station;
        receiving the radio signal by the child seat;
        modifying the radio signal by the child seat;
        transmitting the radio signal after modification by the child seat to the transceiver station;
        sampling the radio signal after modification using the processor, a time of the processor being made available for other tasks between a plurality of individual times of the sampling; and evaluating the radio signal after the sampling is complete;

wherein the radio signal has different frequencies that are used in succession, and the transmitting, the receiving, and the sampling of the radio signal are controlled by a respective interrupt.

7. The device of claim 6, wherein the control device is connected with an occupant recognition arrangement.

* * * * *